United States Patent
Scheffler et al.

(10) Patent No.: US 10,030,624 B2
(45) Date of Patent: Jul. 24, 2018

(54) METHOD FOR AUTOMATICALLY SWITCHING OFF AN INTERNAL COMBUSTION ENGINE

(71) Applicant: Bayerische Motoren Werke Aktiengesellschaft, Munich (DE)

(72) Inventors: Till Scheffler, Munich (DE); Stefan Uhl, Marzlig (DE); Johann Hofmann, Bruckmuehl (DE); Georg Meder, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 757 days.

(21) Appl. No.: 14/593,729

(22) Filed: Jan. 9, 2015

(65) Prior Publication Data

US 2015/0126331 A1    May 7, 2015

Related U.S. Application Data

(63) Continuation of application No. PCT/EP2013/064080, filed on Jul. 3, 2013.

(30) Foreign Application Priority Data

Jul. 10, 2012 (DE) .................... 10 2012 212 038

(51) Int. Cl.
    *F02N 11/08*     (2006.01)
    *F02D 41/02*     (2006.01)
    (Continued)

(52) U.S. Cl.
    CPC ......... *F02N 11/0833* (2013.01); *B60W 10/06* (2013.01); *B60W 10/10* (2013.01);
    (Continued)

(58) Field of Classification Search
    CPC ................. B60W 10/06; B60W 10/10; B60W 30/18018; B60W 30/192; F02N 11/0833
    See application file for complete search history.

(56) References Cited

U.S. PATENT DOCUMENTS 4,630,577 A    12/1986  Cornacchia
7,941,266 B2    5/2011  Bayerle et al.
(Continued)

FOREIGN PATENT DOCUMENTS

CN    1748080 A      3/2006
CN    102220914 A   10/2011
(Continued)

OTHER PUBLICATIONS

International Search Report dated Jan. 27, 2014 (Three (3) pages).
(Continued)

*Primary Examiner* — Derek D Knight
(74) *Attorney, Agent, or Firm* — Crowell & Moring LLP

(57) ABSTRACT

The invention relates to a method for automatically switching off an internal combustion engine in a motor vehicle, in particular in a motor vehicle having an automatic transmission, by means of a stop/start device, which initiates measures for automatically switching off the internal combustion engine if the vehicle has been braked to a stop and advantageously held at a stop by actuation of the brake pedal for a predefined time interval. The invention is characterized in that the rotation speed of the internal combustion engine is changed, in particular reduced, at a defined point in time before the measures for automatically switching off the internal combustion engine are initiated.

12 Claims, 1 Drawing Sheet

(51) Int. Cl.
  *F02D 41/04* (2006.01)
  *B60W 10/06* (2006.01)
  *B60W 10/10* (2012.01)
  *B60W 30/18* (2012.01)
  *B60W 30/192* (2012.01)
  *F02D 29/02* (2006.01)

(52) U.S. Cl.
  CPC .... *B60W 30/18018* (2013.01); *B60W 30/192* (2013.01); *F02D 29/02* (2013.01); *F02D 41/0205* (2013.01); *F02D 41/042* (2013.01); *F02N 11/084* (2013.01); *F02N 11/0814* (2013.01); *F02D 2400/12* (2013.01); *F02D 2700/07* (2013.01); *Y02T 10/48* (2013.01); *Y10T 477/677* (2015.01); *Y10T 477/81* (2015.01)

(56) References Cited

U.S. PATENT DOCUMENTS

| | | |
|---|---|---|
| 8,323,152 B2 | 12/2012 | Albrecht |
| 8,770,173 B2 | 7/2014 | Han et al. |
| 2009/0157284 A1* | 6/2009 | Bayerle .......... F02D 41/042 701/112 |

FOREIGN PATENT DOCUMENTS

| | | |
|---|---|---|
| CN | 102239328 A | 11/2011 |
| DE | 100 23 331 A1 | 6/2001 |
| DE | 10 2004 044 473 A1 | 3/2006 |
| DE | 10 2007 009 883 B4 | 1/2009 |
| DE | 10 2007 060 019 B3 | 4/2009 |
| DE | 10 2008 060 350 A1 | 6/2010 |
| DE | 10 2009 039 090 A1 | 3/2011 |
| DE | 10 2011 016 116 A1 | 4/2012 |
| DE | 10 2010 051 963 A1 | 5/2012 |
| EP | 1 593 830 A1 | 11/2005 |
| EP | 0 158 605 B1 | 7/2008 |

OTHER PUBLICATIONS

German Search Report dated Dec. 18, 2012 (Six (6) pages).
Chinese Office Action issued in Chinese counterpart application No. 201380036594.5 dated Dec. 28, 2015, with English translation (Eleven (11) pages).

* cited by examiner

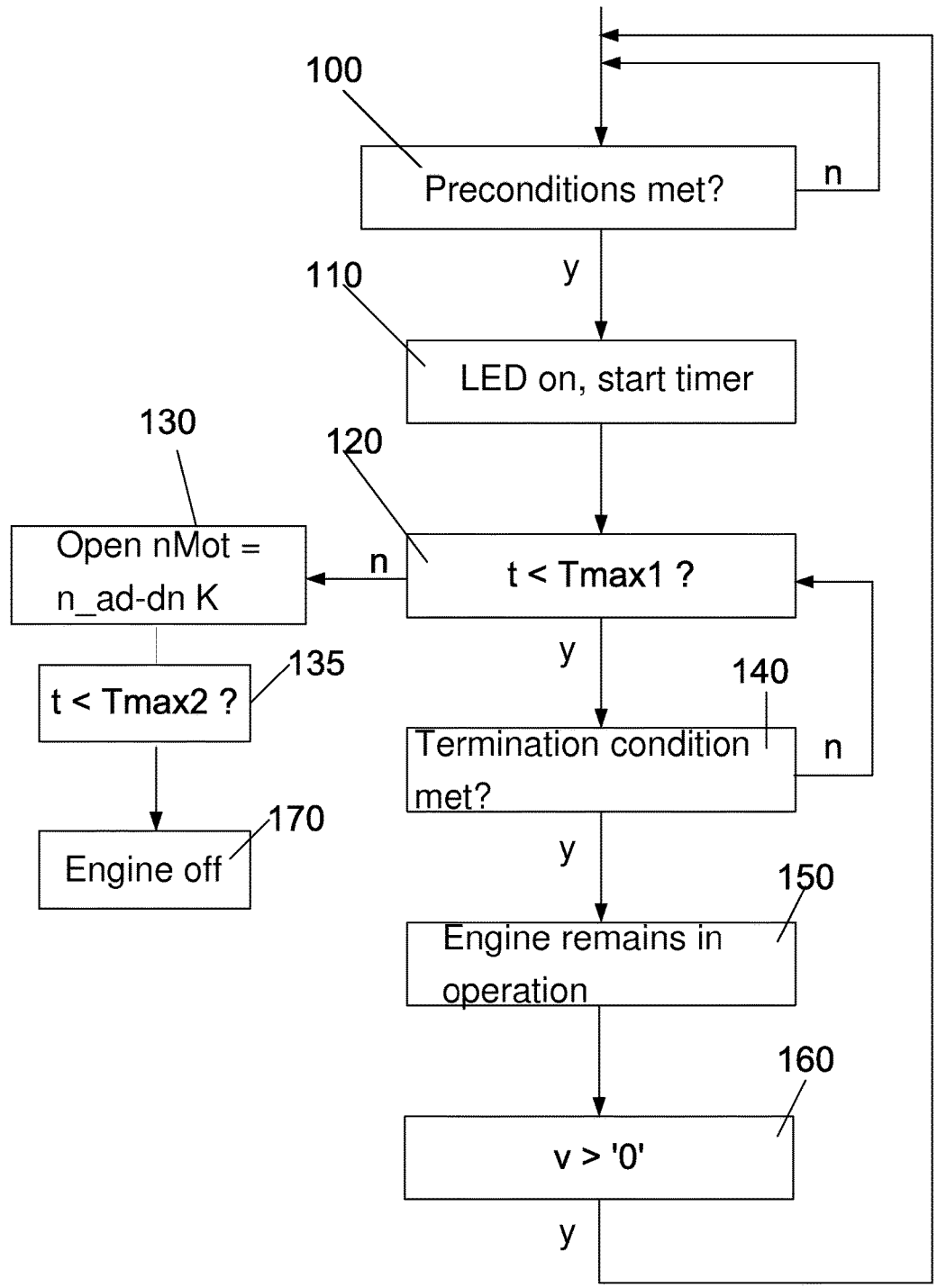

METHOD FOR AUTOMATICALLY SWITCHING OFF AN INTERNAL COMBUSTION ENGINE

CROSS REFERENCE TO RELATED APPLICATIONS

This application is a continuation of PCT International Application No. PCT/EP2013/064080, filed Jul. 3, 2013, which claims priority under 35 U.S.C. § 119 from German Patent Application No. 10 2012 212 038.6, filed Jul. 10, 2012, the entire disclosures of which are herein expressly incorporated by reference.

BACKGROUND AND SUMMARY OF THE INVENTION

The invention relates to a method for automatically switching off an internal combustion engine.

Currently, internal combustion engines are usually switched off manually by the driver by means of an ignition key. An exception is introduced in German Patent Document DE 100 23 331 A1. In this case, the brake pedal position or the brake pedal pressure is analyzed instead of the ignition key. The switch-off operation of the internal combustion engine will be initiated if, after the motor vehicle has been braked to stop, the brake pedal is increasingly actuated in its already actuated position. This type of a method has the disadvantage that only the motor vehicle driver is responsible for switching off the internal-combustion engine. Analyses of the current driving behavior have demonstrated that, despite a raised awareness of the environment and higher fuel prices, a manual switching-off of the internal combustion engine, for example, at traffic lights, rarely takes place independently.

In order to reduce fuel consumption and pollutant emissions, methods and systems are currently being developed and partially also already in use, which automatically switch off the internal combustion engine of a motor vehicle under certain prerequisites or in the presence of specified switch-off conditions and automatically switch the internal combustion engine back on in the presence of specified switch-on conditions. Such methods and systems or start/stop devices are mainly suitable for city traffic for reducing fuel consumption because, in city traffic, the vehicle often comes to a stop at traffic lights or as a result of traffic, and the operation of the internal combustion engine is not required.

A system is known, for example, from European Patent Document EP 0 158 605 B1, which causes a switching-off or restarting of the internal-combustion engine as a function of different conditions. One condition for initiating an automatic switch-off operation is, for example, that the vehicle speed has to be below a threshold value for a certain time before the internal combustion engine will automatically be switched off.

From German Patent Document DE 10 2008 060 350 A1, a method for automatically switching off an internal combustion engine of an automatic vehicle by means of a start/stop device is known, by which the start/stop device automatically switches off the internal-combustion engine when the vehicle has been braked to a stop and was held in the stopped position for a specified time interval by an actuation of the brake pedal.

In the case of vehicles with automatic transmissions which are automatically switched off when the vehicle is held in a stopped position, as a result of the fact that the transmission, or the transmission-side turbine of a torque converter arranged between the engine and the transmission, is stationary and the engine or the engine-side pump of the torque converter non-rotatably connected with the engine, is still running, the problem arises that, because of the rotational-speed difference between the engine output (or impeller of the converter) and the transmission (or output rotor of the converter), a transmission absorption torque will build up which, during the automatic switch-off of the internal-combustion engine, may result in a jolt during the engine coast-down because of longitudinal and transverse vibrations, which may be perceived as uncomfortable by the driver.

For reasons of completeness, reference is also made to German Patent Document DE 10 2007 009 833 B4, which discloses a method for controlling an automatic switch-off operation of an internal combustion engine, by which the switch-off measures are divided into preparatory switch-off measures and remaining switch-off measures. The preparatory switch-off measures for automatically switching off the internal combustion engine are carried out even before the occurrence of all specified switch-off conditions, so that a fast and more comfortable automatic switching-off of the internal combustion engine becomes possible.

It is now an object of the invention to indicate a method for automatically switching off an internal-combustion engine in a vehicle, which permits a comfortable automatic switching-off of the internal-combustion engine.

According to one embodiment of the invention, this object is achieved by a method for automatically switching off an internal combustion engine in a motor vehicle, preferably in a motor vehicle with an automatic transmission, by means of a start/stop device, initiates measures for automatically switching off the internal combustion engine if (in addition to the other specified and met switch-off conditions) the vehicle has been braked to a stop and advantageously held at the stop by an actuation of the brake pedal for a specified time interval. Within the specified time interval after having reached the stop, the driver can be given the opportunity to prevent the automatic switching-off. The automatic switching-off should, for example, be prevented if the driver recognizes that a continuation of the drive is imminent.

It is now the basic idea of the invention to ensure by appropriate measures that a low transmission absorption torque is present when the automatic switch-off operation is initiated, so that, when the internal combustion engine is automatically switched off, either no jolt or only a very slight jolt is generated as a result of the rapid torque reduction. Based on the above, the method according to the invention is characterized in that, at a defined point in time before the initiation of the measures for automatically switching off the internal combustion engine, the rotational speed of the internal-combustion engine is changed, or advantageously reduced.

As a result of the reduction of the rotational speed of the internal-combustion engine, the differential speed between the (rotating engine) and the (stationary) transmission is also reduced, so that, in turn, a reduced transmission absorption torque will occur. Thus, during the automatic switch-off operation of the internal-combustion engine, only a lower transmission absorption torque has to be reduced, which, in turn, causes lower longitudinal and/or transverse vibrations. The possibly still occurring jolt will become smaller and advantageously so small that it will no longer be perceived as uncomfortable by the driver. The defined point in time may be specified to be fixed or variable.

Advantageously, the rotational speed of the internal-combustion engine may be changed as a function of the actual rotational speed of the internal combustion engine and/or of the presence of specified operating conditions of the motor vehicle. Should the rotational speed of the internal combustion engine, for example, fall below an already low rotational speed threshold, so that a further reduction would result in a deterioration of the running of the engine, no further reduction of the engine rotational speed will take place. Likewise, it is meaningful to carry out the change of that rotational speed of the internal combustion engine only when specified operating conditions of the motor vehicle are present, which ensures that a change or reduction of the rotational speed of the internal combustion engine has no negative effects on the operation of the motor vehicle or on the automatic switch-off operation.

Advantageously, the amount of change of the rotational speed, particularly the amount of the reduction of the rotational speed of the internal combustion engine, may also be carried out as a function of the actual rotational speed of the internal-combustion engine and/or of the presence of specified operating conditions of the motor vehicle. For example, if the actual rotational speed is very high because of many active energy consuming devices of the vehicle, a higher reduction of the rotational speed of the internal combustion engine can be carried out than if the rotational speed of the internal combustion engine already is very low anyhow.

In a particularly advantageous further development of the invention, for example, the operation of an air-conditioning system of the motor vehicle may be taken into account because, during the operation of the air-conditioning system, the rotational speed of the internal combustion engine is higher, as a rule, than when the air-conditioning system is not in operation and therefore deactivated. The method according to the invention can therefore be further developed such that, during the operation of an air-conditioning system of the motor vehicle, which demands a higher rotational speed of the internal-combustion engine, at the defined point in time before the initiating of the measures for automatically switching off the internal combustion engine, the rotational speed of the internal combustion engine is reduced to a specified value, particularly to a value which is set when the air-conditioning system is deactivated, while the operating conditions of the motor vehicle are otherwise the same.

In addition to changing the rotational speed of the internal combustion engine at a defined point in time before initiating the measures for automatically switching off the internal-combustion engine, further preparatory measures can also be initiated, particularly those which also have a positive effect on comfort during the automatic switching-off of the internal combustion engine during the stopping of the motor vehicle equipped with an automatic transmission or automated transmission.

Advantageously, the method may therefore be further developed such that, at a defined second point in time before the initiating of the measures for automatically switching off the internal combustion engine,—in which case the defined second point in time may be identical with the defined (first) point in time)—a clutch of the automatic transmission is triggered in a changed fashion, particularly such that the clutch pressure is reduced. As a result, a slip will occur in the clutch, by which the transmission absorption torque can be reduced.

Other objects, advantages and novel features of the present invention will become apparent from the following detailed description of one or more preferred embodiments when considered in conjunction with the accompanying drawings.

BRIEF DESCRIPTION OF THE DRAWINGS

An embodiment of the invention is illustrated in the drawing. The FIGURE indicates a simplified flow chart of the method according to the invention on the example of a motor vehicle having an automatic transmission.

DETAILED DESCRIPTION OF THE DRAWINGS

The process for automatically switching off an internal combustion engine is integrated in a start/stop device or in a control unit. In a first Step 100, all preconditions (operating conditions and supplementary conditions) are queried, which are necessary for an automatic switching-off of the internal combustion engine. These are, for example, the vehicle speed, which has to be approximately zero (stopping of the vehicle); the rotational speed, which has to be below a specified limit value; and the brake pedal, which has to be actuated. Only if all preconditions have been met, will the process be continued. Otherwise, the process is terminated, and the process will start from the beginning.

If all preconditions have been met, an LED will be switched on as the display element in a second Step 110. The vehicle driver is thereby informed that the internal combustion engine will be switched off after a specified time, unless he prevents this switching-off. Simultaneously, a timer is started in Step 110, which monitors the time t.

Subsequently, the time t that has passed will be monitored in a next Step 120, in comparison to a specified first time interval Tmax1 or a defined point in time Tmax1. In this case, the time interval or the defined (end) point in time Tmax1 of the time interval is selected such that it indicates that, with the expiration of this first time interval Tmax1, the point in time for initiating the measures for automatically switching off the internal-combustion engine is imminent. There are, for example, 600 ms between the expiration of this first time interval Tmax1 and the beginning of the automatic switch-off operation of the internal combustion engine. The point in time Tmax1 therefore characterizes a defined (first) point in time before the initiating of the measures for the automatic switch-off operation of the internal combustion engine.

As long as the elapsed time t is within the specified first time interval Tmax1, it is continuously monitored in a next Step 140 whether a termination condition is present. A termination condition may exist, for example, when the driver releases the brake pedal because he wants to start driving. If no termination condition is detected, a return takes place to Step 120 and the time monitoring will be continued.

However, if the presence of a termination condition is detected in Step 140, for example, because of a releasing of the brake pedal, this represents the signal that, in a next Step 150, the automatic switching-off of the internal-combustion engine will be prevented and the internal-combustion engine will remain in operation. It is only when gas is given in a last Step 160 and the vehicle speed is again greater than approximately zero, that the process will be started again.

However, if it is now determined in Step 120 that the elapsed time t is at least not shorter than the specified time interval Tmax1, the start/stop device will send a signal with the information that the automatic switch-off operation is imminent. Subsequently, in Step 130, at the defined point in time Tmax1, before the initiating of the measures for automatically switching off the internal combustion engine, the rotational speed of the internal combustion engine nMot is changed such that the actual rotational speed n_a is lowered by a specified differential speed value dn. Furthermore, the clutch K of the automatic transmission is actively opened, so that a slip occurs.

After these preparatory measures, a change takes place to Step 135 and it is waited until a specified time interval Tmax2 has expired, which results in the initiating of the switch-off measures of the internal combustion engine. If this point in time Tmax2 or the end of this second point in time Tmax2 has been reached, in the next Step 170, the measures are initiated for automatically switching off the internal combustion engine and the internal combustion engine is switched off.

By means of this method, it can therefore be ensured in a simple and cost-effective manner that, particularly in the case of vehicles equipped with an automatic transmission, a comfortable, and ideally, jolt-free automatic switch-off operation is achieved.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for automatically switching off an internal combustion engine in a motor vehicle with an automatic transmission using a start/stop device which initiates measures for automatically switching off the internal combustion engine when the vehicle has been braked to a stop and held at the stop by an actuation of the brake pedal for a specified time interval, wherein during operation of an air-conditioning system of the motor vehicle, at a defined point in time and before the initiating of the measures for automatically switching off the internal combustion engine, the rotational speed of the internal combustion engine is reduced to a specified value which is based on a deactivated state of an air-conditioning system of the motor vehicle.

2. The method according to claim 1, wherein the rotational speed of the internal combustion engine is changed as a function of the actual rotational speed and/or of the presence of specified operating conditions of the motor vehicle.

3. The method according to claim 2, wherein an amount of a reduction of the rotational speed takes place as a function of the actual rotational speed and/or of the presence of specified operating conditions of the motor vehicle.

4. The method according to claim 2, wherein, at a defined second point in time, before the initiating of the measures for automatically switching off the internal combustion engine, a clutch of the automatic transmission is triggered such that the clutch pressure is reduced.

5. The method according to claim 1, wherein an amount of a reduction of the rotational speed takes place as a function of the actual rotational speed and/or of the presence of specified operating conditions of the motor vehicle.

6. The method according to claim 5, wherein, at a defined second point in time, before the initiating of the measures for automatically switching off the internal combustion engine, a clutch of the automatic transmission is triggered such that the clutch pressure is reduced.

7. The method according to claim 1, wherein, at a defined second point in time, before the initiating of measures for automatically switching off the internal combustion engine, further preparatory measures are initiated.

8. The method according to claim 1, wherein, at a defined second point in time, before the initiating of the measures for automatically switching off the internal combustion engine, a clutch of the automatic transmission is triggered such that the clutch pressure is reduced.

9. A method for automatically switching off an internal combustion engine in a motor vehicle with an automatic transmission using a start/stop device, wherein the method comprises the acts of:
reducing, during operation of an air-conditioning system of the motor vehicle and in response to the motor vehicle being braked to a stop and held at the stop by an actuation of the brake pedal for a specified time interval, a rotational speed of the internal combustion engine to a specified value which is based on a deactivated state of an air-conditioning system of the motor vehicle; and
initiating, in response to reducing the rotational speed of the internal combustion engine to the specified value, measures for automatically switching off the internal combustion engine.

10. The method according to claim 9, wherein the rotational speed of the internal combustion engine is changed as a function of the actual rotational speed and/or of the presence of specified operating conditions of the motor vehicle.

11. The method according to claim 9, wherein an amount of a reduction of the rotational speed takes place as a function of the actual rotational speed and/or of the presence of specified operating conditions of the motor vehicle.

12. The method according to claim 9, wherein, before the initiating of the measures for automatically switching off the internal combustion engine, a clutch of the automatic transmission is triggered such that the clutch pressure is reduced.

* * * * *